United States Patent
Sasaki et al.

(10) Patent No.: US 7,477,955 B2
(45) Date of Patent: Jan. 13, 2009

(54) OPTIMUM SHAPE DESIGN METHOD AND DESIGN SYSTEM

(75) Inventors: Takanori Sasaki, Yokohama (JP); Toshiharu Yamamoto, Hiratsuka (JP); Yoshihito Fukasawa, Suzuka (JP)

(73) Assignee: Asahi Kasei Life & Living Corporation, Tokyo (JP)

( * ) Notice: Subject to any disclaimer, the term of this patent is extended or adjusted under 35 U.S.C. 154(b) by 178 days.

(21) Appl. No.: 10/565,759

(22) PCT Filed: May 25, 2004

(86) PCT No.: PCT/JP2004/007088

§ 371 (c)(1), (2), (4) Date: Jan. 25, 2007

(87) PCT Pub. No.: WO2005/010782

PCT Pub. Date: Feb. 3, 2005

(65) Prior Publication Data

US 2007/0293967 A1    Dec. 20, 2007

(30) Foreign Application Priority Data

Jul. 24, 2003    (JP) ............................. 2003-278815

(51) Int. Cl.
    *G06F 17/50*    (2006.01)
    *G06F 19/00*    (2006.01)
(52) U.S. Cl. .......................... 700/98; 700/28; 700/105; 700/128
(58) Field of Classification Search .................. 700/28, 700/97, 105, 106, 107, 182
See application file for complete search history.

(56) References Cited

U.S. PATENT DOCUMENTS

| | | | | |
|---|---|---|---|---|
| 6,882,893 B2 * | 4/2005 | Uchida et al. | ................. | 700/98 |
| 2002/0138167 A1 * | 9/2002 | Uchida et al. | ................. | 700/98 |

FOREIGN PATENT DOCUMENTS

| | | |
|---|---|---|
| JP | 2000-331035 | 11/2000 |
| JP | 2002-7487 | 1/2002 |
| JP | 2003-223480 | 8/2003 |

OTHER PUBLICATIONS

S.W. Lye et al., "An integrated framework for protective packaging design and manufacture", International Journal of Production Research UK, vol. 32, No. 8, Aug. 1994, pp. 1837-1856.

(Continued)

*Primary Examiner*—Albert Decady
*Assistant Examiner*—Douglas S Lee
(74) *Attorney, Agent, or Firm*—Staas & Halsey LLP

(57) ABSTRACT

An object of the present invention enables provision of an optimum shape design method in which an optimum shape of a cushioning material used in cushioning packaging can easily and adequately be designed, and an optimum shape design system in which the optimum shape design method is used. In a configuration of the optimum shape design system is characterized by providing an optimizing control unit 2a. The optimizing control unit 2a detects a correlation among CAD data M of a cushioning material 4 defined by a CAD unit 2b, a mechanical response amount detected by a mechanical response amount calculation unit 2c, manufacturing decision information detected by a manufacturing decision detection unit 2d, and manufacturing cost information detected by a cost calculation unit 2e. Then, the optimizing control unit 2a updates the CAD data M of the cushioning material 4 until an optimum shape of the cushioning material 4 is detected based on the correlation. In the optimum shape, the mechanical response amount satisfies design conditions of the cushioning material 4, the cushioning material 4 is producible, and a minimum manufacturing cost is obtained. Then, the optimizing control unit 2a updates the correlation based on the changed CAD data M, and the optimizing control unit 2a detects the optimum shape of the cushioning material 4 based on the updated correlation.

8 Claims, 7 Drawing Sheets

OTHER PUBLICATIONS

S.W. Lye et al., "Investigation into the rapid prototyping of moulds for expanded polystyrene foam", The International Journal of Advanced Manufacturing Technology 1996 Springer-Verlag London Ltd., London, UK, vol. 12, No. 2, 1996, pp. 87-92.

Chuchom Somchai et al., "An integrated design approach for protective packaging", Integrated Manfacturing Systems MCB University Press UK, vol. 11, No. 5, 2000, pp. 321-330.

European Search Report, mailed Jun. 11, 2007 and issued in corresponding European Patent Application No. 04745297.4-2224.

* cited by examiner

US 7,477,955 B2

OPTIMUM SHAPE DESIGN METHOD AND DESIGN SYSTEM

This application is based on and hereby claims priority to PCT Application No. PCT/JP2004/007088 filed on May 25, 2004 and Japanese Application No. 2003-278815 filed on Jul. 24, 2003, the contents of which are hereby incorporated by reference.

TECHNICAL FIELD

The present invention relates to an optimum shape design method and a design system for designing an optimum shape of a cushioning material used in cushioning packaging.

BACKGROUND ART

Conventionally, in the optimum shape design of the cushioning material used in the cushioning packaging, a cushioning thickness and a pressure receiving area are determined so as to satisfy mechanical design conditions based on cushioning performance data of a plate-shaped cushioning material. After the cushioning material shape is formed so as to satisfy the mechanical design conditions, decision of moldability and calculation of manufacturing cost are performed. The design is repeatedly reviewed until the optimum shape is obtained under the mechanical design conditions.

With reference to the conventional structure optimizing method, Japanese Patent Application Laid-Open (JP-A) No. 9-44551 (Patent Document 1) discloses a method, in which pieces of CAD (Computer Aided Design) data of various cushioning materials for packaging products is previously stored in a library group, and the cushioning member is designed by appropriately selecting the CAD data from the stored pieces of CAD data according to the target cushioning member.

JP-A No. 2002-7487 (Patent Document 2) discloses a method in which a minimum value of a cushioning material volume is detected to determine the optimum shape of a structure based on the cushioning material shape whose rigidity is maximized when the cushioning material volume is the minimum volume. In the minimum value of the cushioning material volume, the maximum deceleration of contents satisfies a design tolerance, JP-A No. 2000-331035 (Patent Document 3) discloses a method in which customer's component requirements, such as the maximum weight, minimum lifetime, minimum reliability, minimum strength, durability, a minimum environmental operating condition, an adaptive value to reference, and cost of a design target, are set as parameters.

JP-A NO. 2001-297118 (Patent Document 4) discloses a method, in which the optimum shape of the cushioning material is obtained by inputting an optimum area, and the cushioning material shape with a topology (phase and morphology) change caused by adding/eliminating a rib or a boss can be optimized in a short time.

JP-A No. 3-224063 (Patent Document 5) discloses a method an optimum model satisfying design requirements is designed by inputting cushioning material design requirements, an early-stage shape, applicable scope of design parameter, and a boundary condition.

Patent Document 1: JP-A No. 9-44551
Patent Document 2: JP-A No. 2002-7487
Patent Document 3: JP-A No. 2000-331035
Patent Document 4: JP-A No. 2001-297118
Patent Document 5: JP-A No. 3-224063

DISCLOSURE OF THE INVENTION

However, in the above conventional examples, because guesswork and experience of a designer are required to decrease the repetition of the design review, it is difficult to achieve design automation. Further, since other evaluation items are confirmed after the cushioning thickness and pressure receiving area satisfying the mechanical design conditions are determined, there is a problem that the final design result hardly becomes the true optimum solution.

In view of the foregoing, an object of the invention is to provide an optimum shape design method in which the optimum shape of the cushioning material used in the cushioning packaging can easily and adequately be designed in consideration of the decision of moldability and the manufacturing cost, and an optimum shape design system in which the optimum shape design method is used.

In order to achieve the above object, a typical configuration of an optimum shape design method according to the invention is characterized in that, while a mechanical response amount including at least one of the maximum deceleration and the maximum displacement generated in contents in drop impact and creep displacement generated in long-term use of a cushioning material is detected with respect to a cushioning material shape defined as cushioning material CAD data produced based on design data of said cushioning material used in cushioning packaging, manufacturing decision for said cushioning material shape defined as the CAD data is detected; a correlation among said cushioning material CAD data, said mechanical response amount, and said manufacturing decision is detected; said cushioning material CAD data is changed until an optimum shape of said cushioning material is detected based on said correlation, said mechanical response amount satisfying design conditions of said cushioning material and said cushioning material being producible in the optimum shape; and the correlation among said cushioning material CAD data, said mechanical response amount, and said manufacturing decision is updated based on said changed cushioning material CAD data, and the optimum shape of said cushioning material is detected based on the updated correlation, said mechanical response amount satisfying design conditions of said cushioning material and said cushioning material being producible in the optimum shape.

A typical configuration of an optimum shape design system according to the invention is characterized by including input means for inputting design data of a cushioning material used in cushioning packaging; CAD means for defining a cushioning material shape based on the cushioning material design data inputted by said input means; mechanical response amount calculation means for detecting a mechanical response amount for said cushioning material shape defined by the CAD means, the mechanical response amount including at least one of the maximum deceleration and the maximum displacement generated in contents and creep displacement generated in long-term use of said cushioning material; manufacturing decision detection means for detecting manufacturing decision for said cushioning material shape defined by the CAD means; optimizing control means for detecting a correlation among said cushioning material CAD data defined by the CAD means, said mechanical response amount detected by the mechanical response amount calculation means, and said manufacturing decision information detected by the manufacturing decision detection means, the optimizing control means changing said cushioning material CAD data until said cushioning material optimum shape is detected based on the correlation, said mechanical response amount satisfying design conditions of said cushioning material and said cushioning material being producible in the optimum shape, the optimizing control means updating the correlation among the cushioning material CAD data, said mechanical response amount, and said manufacturing decision based on said changed cushioning material CAD data, the optimizing control means detecting said cushioning material optimum shape based on the updated correlation, said mechanical response amount satisfying design conditions of said cushioning material and said cushioning material being producible in the optimum shape; display means for outputting and displaying said cushioning material optimum shape detected by said optimizing control means.

According to the optimum shape design method of the invention, the correlation among the cushioning material CAD data produced based on the design data of the cushioning material used in the cushioning packaging, the mechanical response amount including at least one of the maximum deceleration and the maximum displacement generated in the contents in the drop impact and the creep displacement generated in the long-term use of the cushioning material with respect to the cushioning material shape defined as the CAD data, and the manufacturing decision is detected, the cushioning material CAD data is changed until the cushioning material optimum shape, in which the mechanical response amount satisfies the design conditions of the cushioning material and the cushioning material is producible, is detected based on the correlation, the correlation among the cushioning material CAD data, the mechanical response amount, and the manufacturing decision is updated based on the changed cushioning material CAD data, and the cushioning material optimum shape, in which the mechanical response amount satisfies the design conditions of the cushioning material and the cushioning material is producible, is detected based on the updated correlation. Therefore, the cushioning material optimum shape can easily and adequately be designed.

According to the optimum shape design system of the invention, the correlation among the CAD data defined by the CAD means based on the cushioning material design data inputted by the input means, the mechanical response amount, calculated by the mechanical response amount calculation means, including at least one of the maximum deceleration and the maximum displacement generated in the contents in the drop impact and the creep displacement generated in the long-term use of the cushioning material with respect to the cushioning material shape defined by the CAD means, and the manufacturing design information detected by the manufacturing decision detection means is detected, the cushioning material CAD data is changed until the cushioning material optimum shape, in which the mechanical response amount satisfies the design conditions of the cushioning material and the cushioning material is producible, is detected based on the correlation, the correlation among the cushioning material CAD data, the mechanical response amount, and the manufacturing decision is updated based on the changed cushioning material CAD data, and the cushioning material optimum shape, in which the mechanical response amount satisfies the design conditions of the cushioning material and the cushioning material is producible, is detected based on the updated correlation. Therefore, the cushioning material optimum shape can easily and adequately be designed.

The invention has the configuration and action as described above, so that the optimum shape of the cushioning material used in the cushioning packaging can easily and adequately be designed in consideration of the decision of moldability and the manufacturing cost.

| Description of the Reference Symbols | |
|---|---|
| 1 | input device |
| 2 | arithmetic processing device |
| 2a | optimizing control unit |
| 2b | CAD unit |
| 2c | mechanical response amount calculation unit |
| 2d | manufacturing decision detection unit |
| 2e | cost calculation unit |
| 3 | display device |
| 4 | cushioning material |
| 4a | hole |
| 4b | slit |
| 5 | contents |
| M, M1 to M8, and Mopt | CAD data |

BEST MODE FOR CARRYING OUT THE INVENTION

Embodiments of an optimum shape design method and a design system according to the invention will specifically be described with reference to the drawings.

Figure 1:
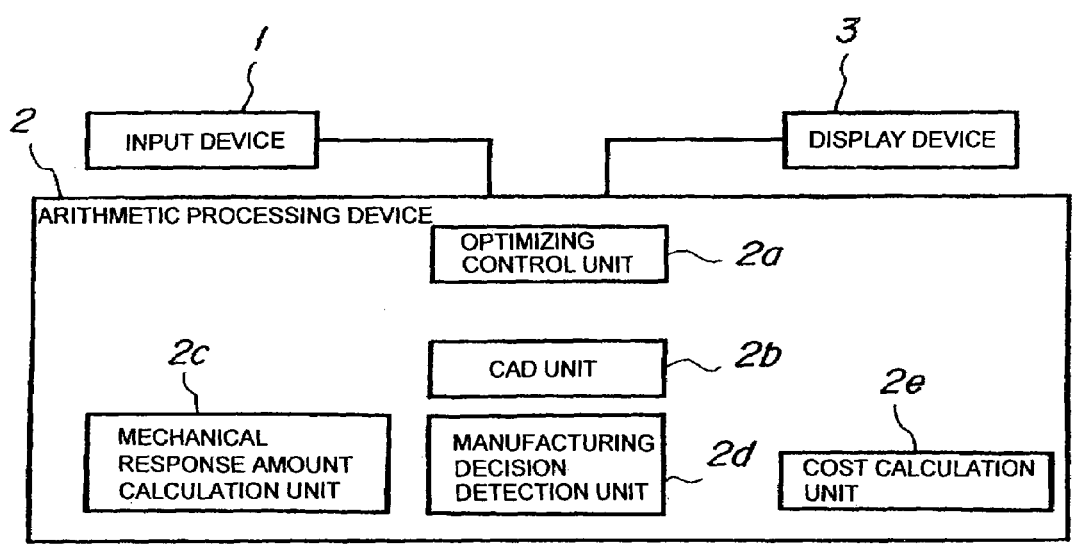
FIG. 1 is a block diagram showing a schematic configuration of an optimum shape design system according to the invention.

In FIG. 1, the numeral 1 designates an input device, which is of the input means for inputting the design data necessary to design a cushioning material 4. The cushioning material 4 is a design target, and the cushioning material 4 used for the cushioning packaging is an article manufactured with a molding die. The input device 1 can input the design data with a keyboard or a mouse provided in a personal computer or the like or through a communication line such as the Internet.

The numeral 2 designates an arithmetic processing device which performs an arithmetic operation to calculate the optimum shape of the cushioning material 4 based on the design data inputted from the input device 1 The numeral 3 designates a display device, such as CRT (Braun tube) or a printer, which is of the display means for outputting and displaying the optimum shape of the cushioning material 4 calculated by the arithmetic processing device 2. The display device 3 also has a function of reading design result stored in a database, a file, and the like to output and display the design result.

The arithmetic processing device 2 includes an optimizing control unit 2a, a CAD unit 2b, a mechanical response amount calculation unit 2c, a manufacturing decision detection unit 2d, a cost calculation unit 2e, and the like. The optimizing control unit 2a is of the optimizing control means for controlling the arithmetic operation performed in an arithmetic processing unit to detect the optimum shape of the cushioning material 4. The CAD unit 2b is of the CAD means for defining the cushioning material shape of the cushioning material 4 based on the design data of the cushioning material 4, which is inputted by the input device 1. The mechanical response amount calculation unit 2c is of the mechanical response amount calculation means for detecting the mechanical response amount including at least one of the maximum deceleration and the maximum displacement generated in contents 5 in the drop impact and the creep displacement generated in the long-term use of the cushioning material 4 with respect to the cushioning material shape of the cushioning material 4 defined by the CAD unit 2b. The manufacturing decision detection unit 2d is of the manufacturing decision detection means for detecting the manufacturing decision with respect to the cushioning material shape of the cushioning material 4 defined by the CAD unit 2b. The cost calculation unit 2e is of the cost calculation means for detecting the manufacturing cost with respect to the cushioning material shape of the cushioning material 4 defined by the CAD unit 2b.

As described later with reference to FIG. 4, the optimizing control unit 2a detects the correlation among the CAD data produced by the CAD unit 2b based on the design data of the cushioning material 4, the mechanical response amount detected by the mechanical response amount calculation unit 2c, the manufacturing decision information detected by the manufacturing decision detection unit 2d, and the manufacturing cost information detected by the cost calculation unit 2e. The optimizing control unit 2a changes the CAD data of the cushioning material 4 until the optimum shape of the cushioning material 4 is detected based on the correlation. In the optimum shape of the cushioning material 4, the cushioning material 4 is producible, the mechanical response amount satisfies the design condition of the cushioning material 4, and the minimum manufacturing cost is achieved in the cushioning material 4. The optimizing control unit 2a updates the previous correlation based on the changed CAD data, the mechanical response amount newly detected by the mechanical response amount calculation unit 2c, the manufacturing decision information detected by the manufacturing decision detection unit 2d again, and the manufacturing cost information newly detected by the cost calculation unit 2e. The optimizing control unit 2a performs the optimizing arithmetic processing for detecting the optimum shape of the cushioning material 4 based on the updated correlation. In the optimum shape of the cushioning material 4, the mechanical response amount satisfies the design condition of the cushioning material 4, the cushioning material 4 is producible, and the minimum manufacturing cost is achieved in the cushioning material 4.

In the embodiment, the manufacturing decision detection unit 2d detects whether the cushioning material 4 is producible or not such that outer circumferences of cross-sectional shapes of cross sections, divided by plural planes perpendicular to an extraction direction a shown in FIGS. 3, 5, 6 and 7 in releasing the cushioning material 4 from the molding die, do not intersect one another when the outer circumferences are projected from the extraction direction a.

With reference to the mechanical response amount detected by the mechanical response amount calculation unit 2c, in the embodiment, the mechanical response amount calculation unit 2c is set to detect at least one of the maximum deceleration and the maximum displacement generated in the contents 5 packaged by the cushioning material 4 in the drop impact and the creep displacement generated in the long-term use of the cushioning material 4.

Then, an example of a procedure in which the optimum shape of the cushioning material 4 is detected by the optimum shape design method according to the invention will be described with reference to FIG. 2. In Step S1, the design data of the cushioning material 4 of the design target is inputted by the keyboard which is of the input device 1 or through the communication line such as the Internet.

For example, in the case where the optimum shape of the cushioning packaging cushioning material 4 is designed, the shape, the weight, a drop height, a drop direction, and design tolerances (for example, tolerances of mechanical response amounts such as the maximum deceleration generated in the contents 5, the maximum displacement of the contents 5 for determining whether the contents 5 drops out from the bottom or the cushioning material 4, and the creep displacement of the cushioning material 4 for determining whether permanent strain is generated in the cushioning material 4 in the long-term use) of the contents 5 and mechanical property values (for example, stress, cushioning thickness and the maximum deceleration, maximum instantaneous strain, and creep strain) of the materials used in an outer case and the cushioning material 4 are inputted as the design data. The dimensions of the outer case such as a corrugated cardboard box, a position of the contents 5 housed in the outer case, and the like are inputted as the design condition if needed.

For the mechanical property values of the materials used for the outer case and cushioning material 4, a storage device in which various pieces of data of the mechanical property values are stored or the database files are prepared, and the mechanical property values may be utilized by searching the mechanical property values from the storage device or the database and file according to the material used.

Figure 2:
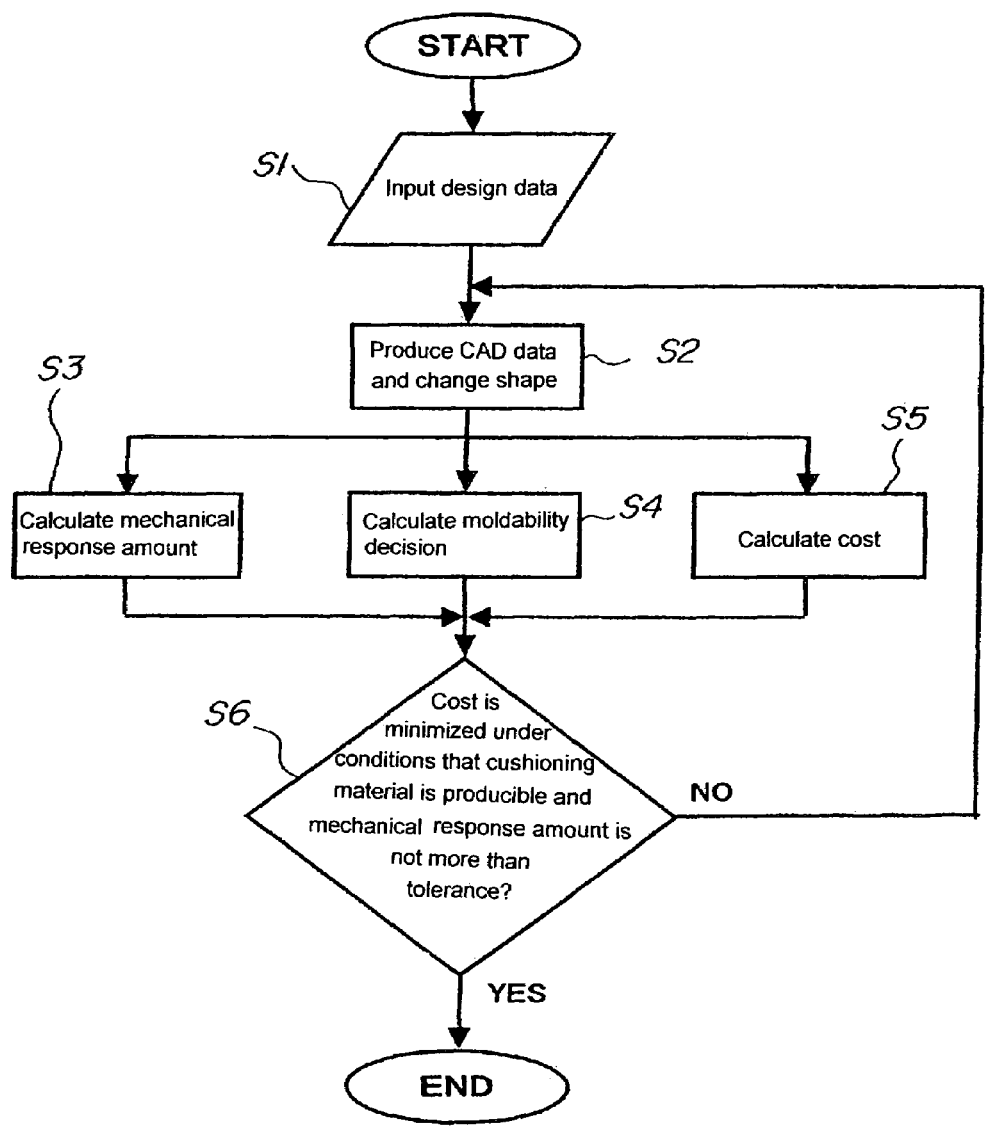
FIG. 2 is a flowchart showing an example of procedures in detecting an optimum shape.
Figure 3:
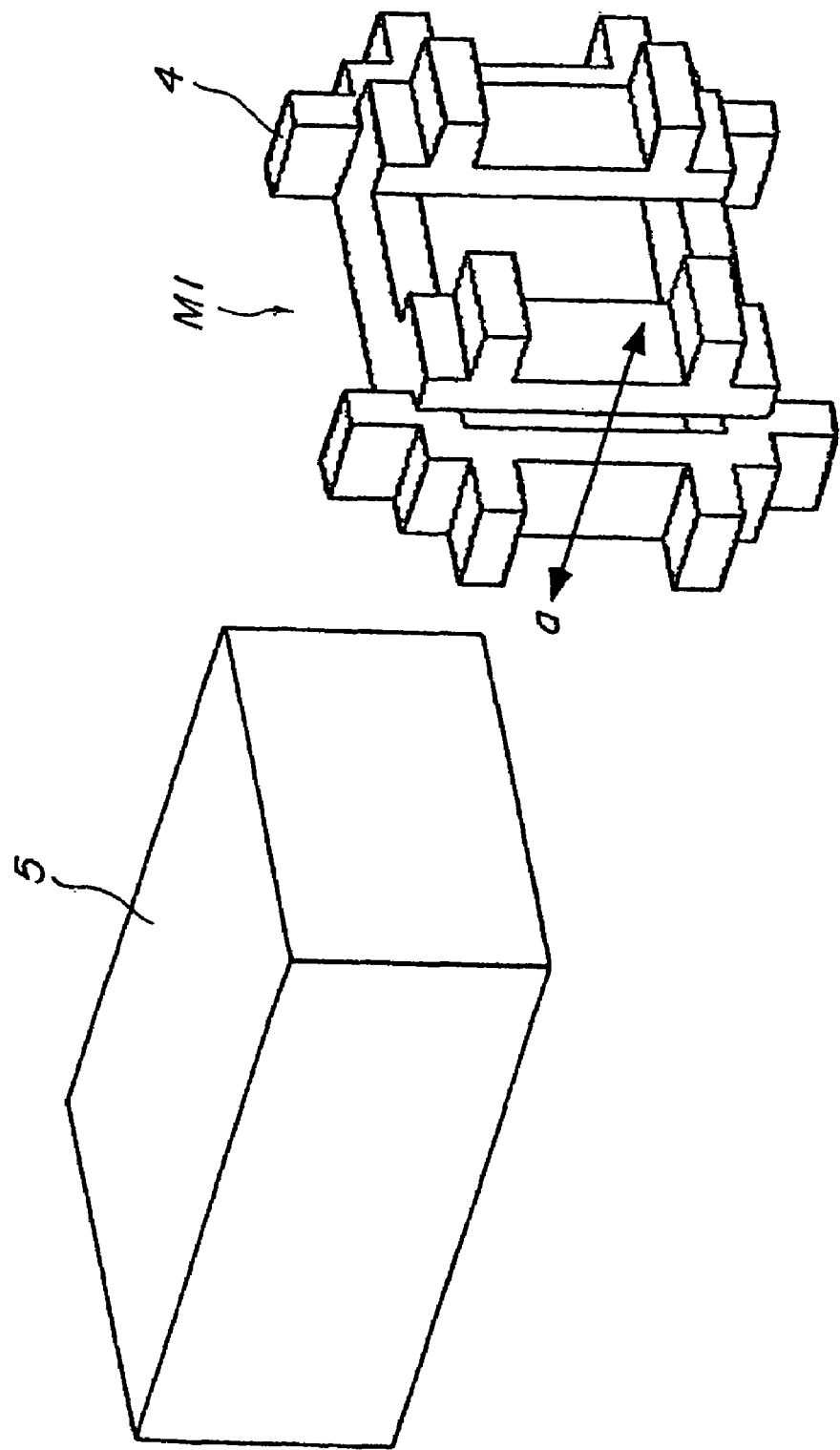
FIG. 3 is a view, drawn by CAD data, showing an example of an early-design-stage shape of contents and a cushioning material for packaging the contents.

When the above design data is inputted, the flow goes to Step S2 of FIG. 2 in the arithmetic processing device 2, for example, CAD data M1 shown in FIG. 3 is produced as an early-design-stage shape of the cushioning material 4 using the CAD unit 2b. At this point, shape data (for example, dimension, angle, and presence or absence of rib or hole) is defined as a design parameter.

Figure 7:
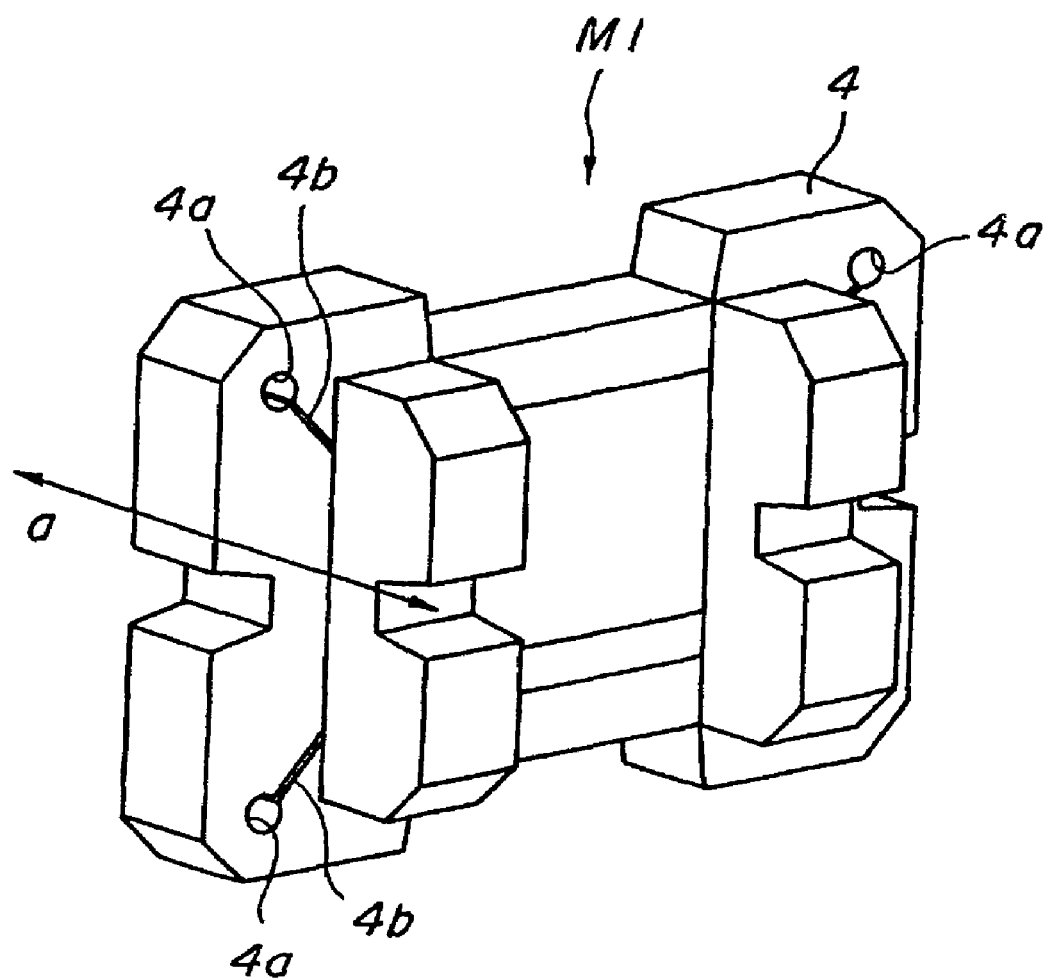
FIG. 7 is a view, drawn by CAD data, showing another early-design-stage shape of the cushioning material.

Instead of the method of newly producing the early-design-stage shape, the CAD data M for the previously designed case may be selected from the database and used as the early-design-stage shape. In this case, plural different early-design-stage shapes of the cushioning material 4 stored in the database shown in FIGS. 3 and 7 are selected, and the plural selected early-design-stage shapes of the cushioning material 4 and the shape data included in each early-design-stage shape may be defined as the design parameter.

Then, the flow goes to Step S3, Step S4, and Step S5, and the following processes are respectively performed in Steps S3, S4, and S5 with respect to the design data inputted in Step S1 and the CAD data M defined in Step S2.

In Step S3, the mechanical response amount calculation unit 2c calculates the mechanical response amount with respect to the CAD data M defined in Step S2. The mechanical response amount is used to compares the design tolerance with respect to the maximum deceleration generated in the contents 5 or the like.

In the calculation of the mechanical response amount, the mechanical response amount corresponding to the mechanical property values of the material used in the cushioning material 4 is appropriately inputted on the spot, or the mechanical response amount is inputted by searching the corresponding mechanical response amount from the mechanical property values, previously stored in the database of the system, of the material used in the cushioning material 4 with the search engine, or the mechanical response amount is calculated by a relational expression when the mechanical property values of the material used in the cushioning material 4 is expressed by the relational expression.

On the other hand, in Step S4, the manufacturing decision detection unit 2d detects the manufacturing decision by detecting whether an extraction gradient for mold release is properly provided in the CAD data M defined in Step S2 when the cushioning material 4 is manufactured with the molding die.

In the moldability detection, a program for examining whether the cross section areas of the cross sections of the cushioning material 4, divided by the plural planes perpendicular to the extraction direction a, are gradually decreased in the extraction direction a while any one of the outer circumferences or inner circumferences of the cross sections intersects another outer circumference or inner circumference may be used, or the detection may be performed by applying an extraction gradient confirmation function equipped with some pieces of CAD software (for example, Solid Works; trade name produced by Solid Works Corporation).

In Step S5, the cost calculation unit 2e calculates the manufacturing cost for the CAD data M defined in Step S2. For example, in the case where a bead foam molding product is used as the cushioning material 4, a value in which the volume of the CAD data M corresponding to the material use amount is multiplied by material unit cost is applied as material cost, running cost of the molding machine and the like are applied as processing cost, and thus the manufacturing cost is calculated.

In the case where a extruding foam molding product is used as the cushioning material 4, a value in which the volume of the CAD data M corresponding to the material use amount is multiplied by material unit cost is applied as the material cost, cutting cost, thermal bonding cost, extraction die cost, and the like are applied as the processing cost, and the manufacturing cost is calculated.

Then, the flow goes to Step S6. For example, the correlation among the design parameters of the CAD data M1 shown in FIG. 3, the mechanical response amount, the manufacturing decision, and the manufacturing cost is drawn like the graph shown in FIG. 4 using the mechanical response amount, the manufacturing decision information, and the manufacturing cost information calculated in Step S3, Step S4, and Step S5. The optimum shape of the cushioning material 4 is determined based on the correlation. In the optimum shape, the cushioning material 4 is producible, the mechanical response amount satisfies the design tolerance of the cushioning material 4, which is of the design target, and the manufacturing cost is in the minimum.

Figure 4:
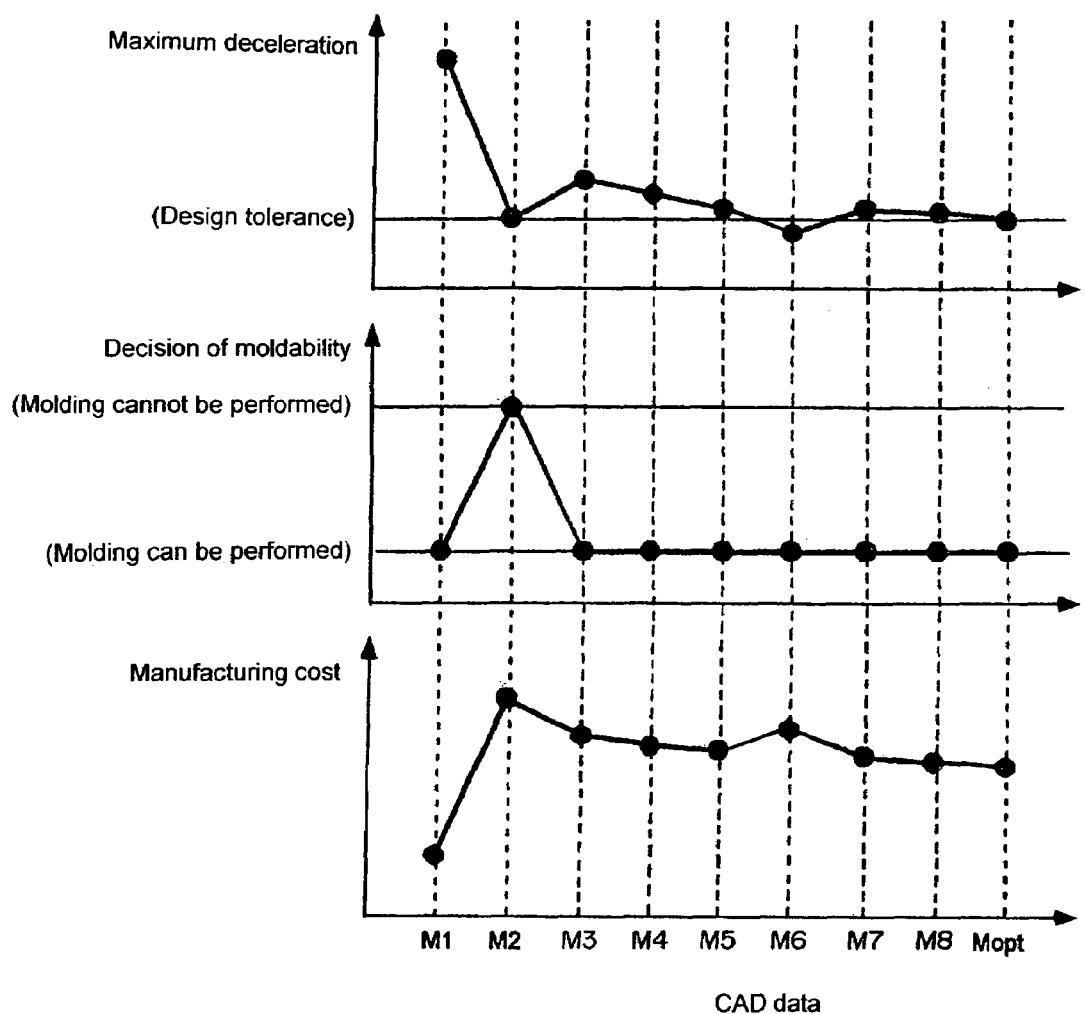
FIG. 4 is a view showing a correlation among CAD data of the cushioning material, a mechanical response amount, manufacturing decision, and manufacturing cost.
Figure 5:
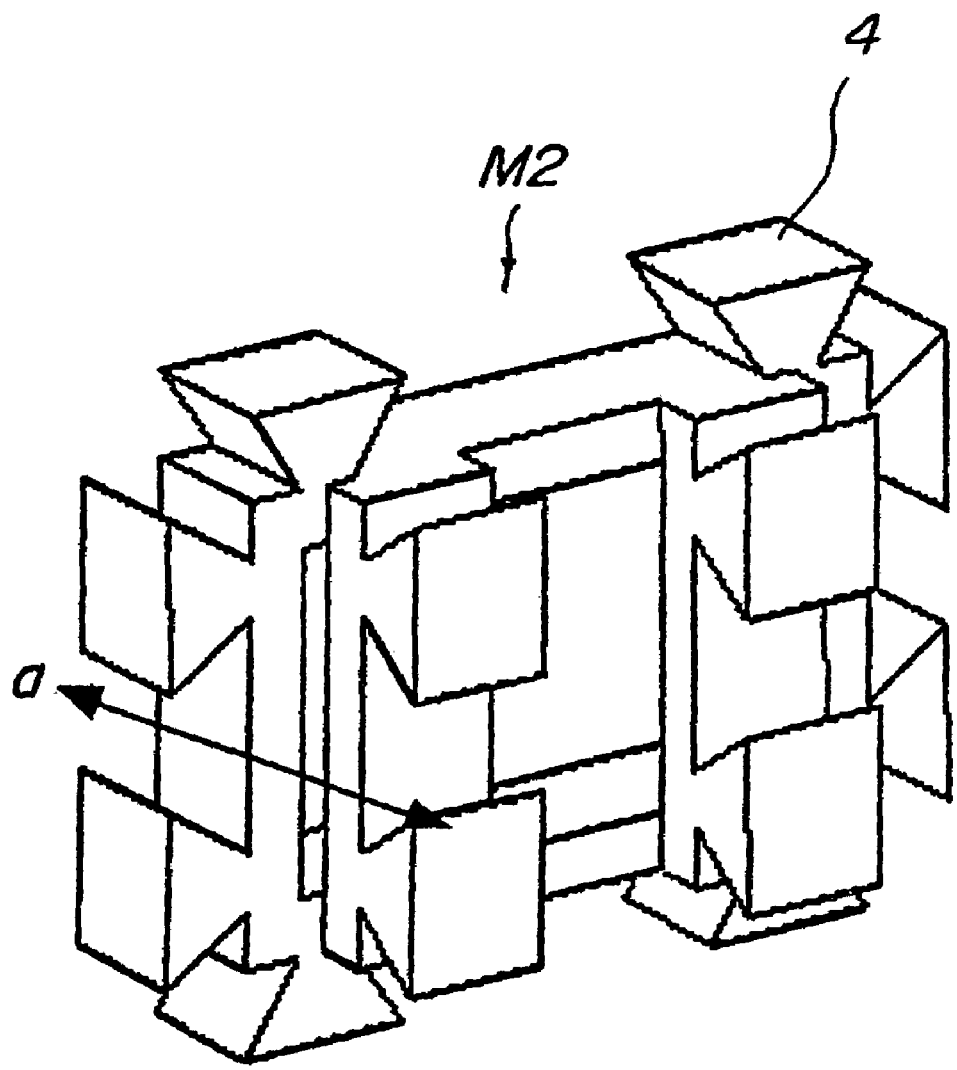
FIG. 5 is a view, drawn by CAD data, showing an example of a cushioning material shape which does not satisfy design conditions in a process of determining the optimum shape.

In the process of determining the optimum shape of the cushioning material 4 which is of the design target, when the design conditions are not satisfied like CAD data M2 shown in FIGS. 4 and 5 (production cannot be performed because the mechanical response amount exceeds the design tolerance), or when the cushioning material shape in which the manufacturing cost can further be reduced exists, the flow returns to Step S2 from Step S6 until the optimum shape is determined. As shown in FIG. 4, the CAD data M is changed to update the correlation among the mechanical response amount, the manufacturing decision, and the manufacturing cost, and the optimum shape is finally determined.

Figure 6:
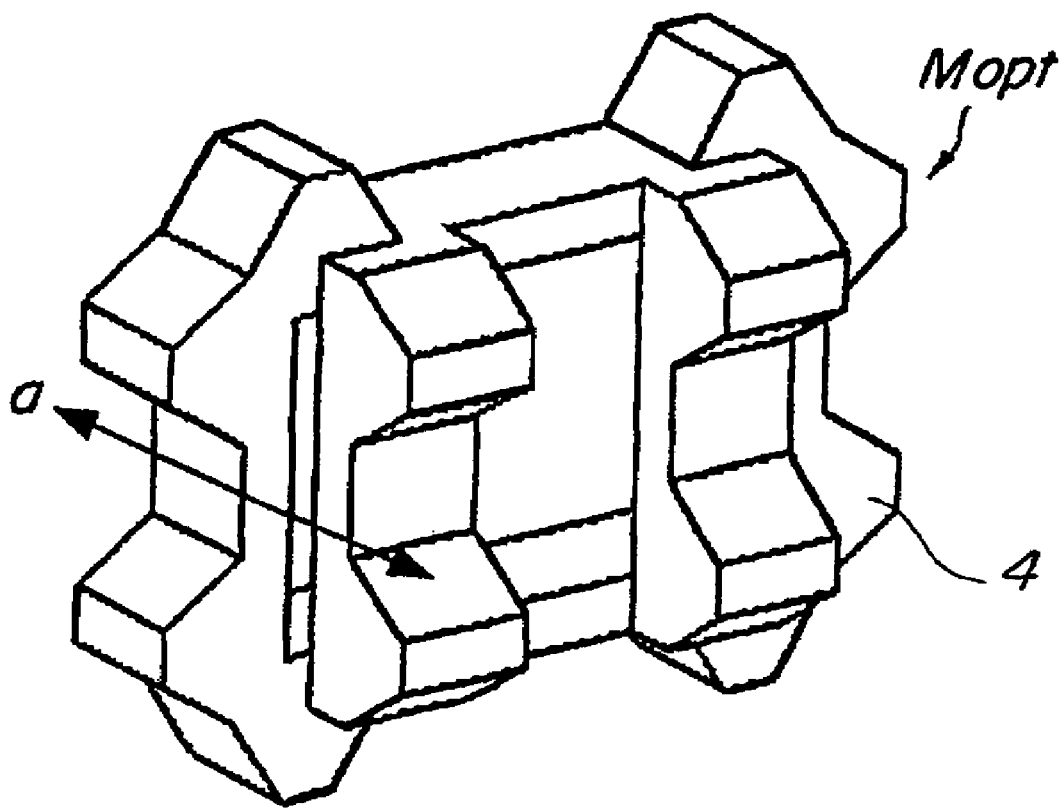
FIG. 6 is a view, drawn by CAD data, showing an example of the optimum shape of the cushioning material.

FIG. 4 shows the state in which the optimization is started from the CAD data M1 shown in FIG. 3, the CAD data M1 is sequentially changed to CAD data M2, M3, . . . , and M8, and, for example CAD data Mopt of the optimum shape of the cushioning material 4 shown in FIG. 6 is obtained in ninth optimization. A general purpose optimizing program such as iSight (trade name; produced by Engineous Software Inc.) is applied to the optimizing control unit 2a for determining the optimum shape of the cushioning material 4 which is of the design target.

FIG. 7 is a view, drawn by CAD data, showing another early-design-stage shape of the cushioning material. In FIG. 7, the numeral 4a designates holes made in four corners of the cushioning material 4, and the numeral 4b designates a slit extending from the hole 4a to an opening portion of the cushioning material 4. Thus, as shown in FIGS. 3 and 7, the plural early-design-stage shapes of the cushioning material 4 stored in the database are selected, and the selected early-design-stage shapes of the cushioning material 4 and the pieces of shape data included in the early-design-stage shapes may be defined as the design parameter.

In the embodiment, since the CAD data M is used as the design parameter, the work for producing the drawing and machining NC data is facilitated for the determined optimum shape.

Further, not only the mechanical response amount but also the manufacturing decision and the manufacturing cost are also added to the optimum condition, the optimum shape can be obtained with high productivity including processing characteristics and economic efficiency.

INDUSTRIAL APPLICABILITY

For example, the invention can be utilized to the design method and design system for designing the optimum shape of the cushioning material used in the cushioning packaging.

The invention claimed is:

1. An optimum shape design method characterized in that, while a mechanical response amount including at least one of the maximum deceleration and the maximum displacement generated in contents in drop impact and creep displacement generated in long-term use of a cushioning material is detected with respect to a cushioning material shape defined as cushioning material CAD data produced based on design data of said cushioning material used in cushioning packaging, manufacturing decision for said cushioning material shape defined as the CAD data is detected, a correlation among said cushioning material CAD data, said mechanical response amount, and said manufacturing decision is detected, said cushioning material CAD data is changed until an optimum shape of said cushioning material is detected based on said correlation, said mechanical response amount satisfying design conditions of said cushioning material and said cushioning material being producible in the optimum shape, and the correlation among said cushioning material CAD data, said mechanical response amount, and said manufacturing decision is updated based on said changed cushioning material CAD data, and the optimum shape of said cushioning material is detected based on the updated correlation, said mechanical response amount satisfying design conditions of said cushioning material and said cushioning material being producible in the optimum shape.

2. An optimum shape design method characterized in that, a mechanical response amount including at least one of the maximum deceleration and the maximum displacement generated in contents in drop impact and creep displacement generated in long-term use of a cushioning material is detected with respect to a cushioning material shape defined as cushioning material CAD data produced based on design data of said cushioning material used in cushioning packaging, manufacturing decision for said cushioning material shape defined as the CAD data is detected, and manufacturing cost is detected with respect to said cushioning material shape defined as the CAD data, a correlation among said cushioning material CAD data, said mechanical response amount, said manufacturing decision, and said manufacturing cost is detected, said cushioning material CAD data is changed until an optimum shape of said cushioning material is detected based on said correlation, said mechanical response amount satisfying design conditions of said cushioning material, said cushioning material being producible, and minimum manufacturing cost being obtained in the optimum shape, and the correlation among said cushioning material CAD data, said mechanical response amount, said manufacturing decision, and said manufacturing cost is updated based on said changed cushioning material CAD data, and the optimum shape of said cushioning material is detected based on the updated correlation, said mechanical response amount satisfying design conditions of said cushioning material, said cushioning material being producible, and the minimum manufacturing cost being obtained in the optimum shape.

3. The optimum shape design method according to claim 1, characterized in that said cushioning material is an item manufactured by using a molding die, and the manufacturing decision is detected such that outer circumferences of cross-sectional shapes of cross sections, divided by a plurality of planes perpendicular to an extraction direction in releasing the item and the molding die from each other do not intersect one another when the outer circumferences are projected from the extraction direction.

4. An optimum shape design system characterized by including:

input means for inputting design data of a cushioning material used in cushioning packaging;

CAD means for defining a cushioning material shape based on the cushioning material design data inputted by said input means;

mechanical response amount calculation means for detecting a mechanical response amount for said cushioning material shape defined by the CAD means, the mechanical response amount including at least one of the maximum deceleration and the maximum displacement generated in contents and creep displacement generated in long-term use of said cushioning material;

manufacturing decision detection means for detecting manufacturing decision for said cushioning material shape defined by the CAD means;

optimizing control means for detecting a correlation among said cushioning material CAD data defined by the CAD means, said mechanical response amount detected by the mechanical response amount calculation means, and said manufacturing decision information detected by the manufacturing decision detection means, the optimizing control means changing said cushioning material CAD data until said cushioning material optimum shape is detected based on the correlation, said mechanical response amount satisfying design conditions of said cushioning material and said cushioning material being producible in the optimum shape, the optimizing control means updating the correlation among the cushioning material CAD data, said mechanical response amount, and said manufacturing decision based on said changed cushioning material CAD data, the optimizing control means detecting said cushioning material optimum shape based on the updated correlation, said mechanical response amount satisfying design conditions of said cushioning material and said cushioning material being producible in the optimum shape;

display means for outputting and displaying said cushioning material optimum shape detected by said optimizing control means.

5. An optimum shape design system characterized by including:

input means for inputting design data of a cushioning material used in cushioning packaging;

CAD means for defining a cushioning material shape based on the cushioning material design data inputted by said input means;

mechanical response amount calculation means for detecting a mechanical response amount for said cushioning material shape defined by the CAD means, the mechanical response amount including at least one of the maximum deceleration and the maximum displacement generated in contents and creep displacement generated in long-term use of said cushioning material;

manufacturing decision detection means for detecting manufacturing decision for said cushioning material shape defined by the CAD means;

cost calculation means for detecting manufacturing cost for said cushioning material shape defined by the CAD means;

optimizing control means for detecting a correlation among said cushioning material CAD data defined by the CAD means, said mechanical response amount detected by the mechanical response amount calculation means, said manufacturing decision information detected by the manufacturing decision detection means, and said manufacturing cost information detected by the cost calculation means, the optimizing control means updating said cushioning material CAD data until said cushioning material optimum shape is detected based on the correlation, said mechanical response amount satisfying design conditions of said cushioning material, said cushioning material being producible, and minimum manufacturing cost being obtained in the optimum shape, the optimizing control means updating the correlation among the cushioning material CAD data, said mechanical response amount, said manufacturing decision, and said manufacturing cost based on said changed cushioning material CAD data, the optimizing control means detecting said cushioning material optimum shape based on the updated correlation, said mechanical response amount satisfying design conditions of said cushioning material, said cushioning material being producible, and the minimum manufacturing cost being obtained in the optimum shape;

display means for outputting and displaying said cushioning material optimum shape detected by said optimizing control means.

6. The optimum shape design system according to claim 4, characterized in that said cushioning material is an item manufactured by using a molding die, and the manufacturing decision is detected such that outer circumferences of cross-sectional shapes of cross sections, divided by a plurality of planes perpendicular to an extraction direction in releasing the item and the molding die from each other do not intersect one another when the outer circumferences are projected from the extraction direction.

7. The optimum shape design method according to claim 2, characterized in that said cushioning material is an item manufactured by using a molding die, and the manufacturing decision is detected such that outer circumferences of cross-sectional shapes of cross sections, divided by a plurality of planes perpendicular to an extraction direction in releasing the item and the molding die from each other do not intersect one another when the outer circumferences are projected from the extraction direction.

8. The optimum shape design system according to claim 5, characterized in that said cushioning material is an item manufactured by using a molding die, and the manufacturing decision is detected such that outer circumferences of cross-sectional shapes of cross sections, divided by a plurality of planes perpendicular to an extraction direction in releasing the item and the molding die from each other do not intersect one another when the outer circumferences are projected from the extraction direction.

* * * * *

UNITED STATES PATENT AND TRADEMARK OFFICE
CERTIFICATE OF CORRECTION

PATENT NO.       : 7,477,955 B2                                        Page 1 of 1
APPLICATION NO.  : 10/565759
DATED            : January 13, 2009
INVENTOR(S)      : Takanori Sasaki et al.

It is certified that error appears in the above-identified patent and that said Letters Patent is hereby corrected as shown below:

Title Page, Column 1 item 75 (Inventors), Line 3, change "Suzuka" to --Ibaragi--.

Signed and Sealed this

Twenty-fourth Day of March, 2009

JOHN DOLL
*Acting Director of the United States Patent and Trademark Office*